May 12, 1964

D. W. COOPER 3,132,399

QUICK-RELEASE DEVICE

Filed March 2, 1961

INVENTOR
DANIEL W. COOPER

BY
Shoemaker and Mattare
ATTORNEY.

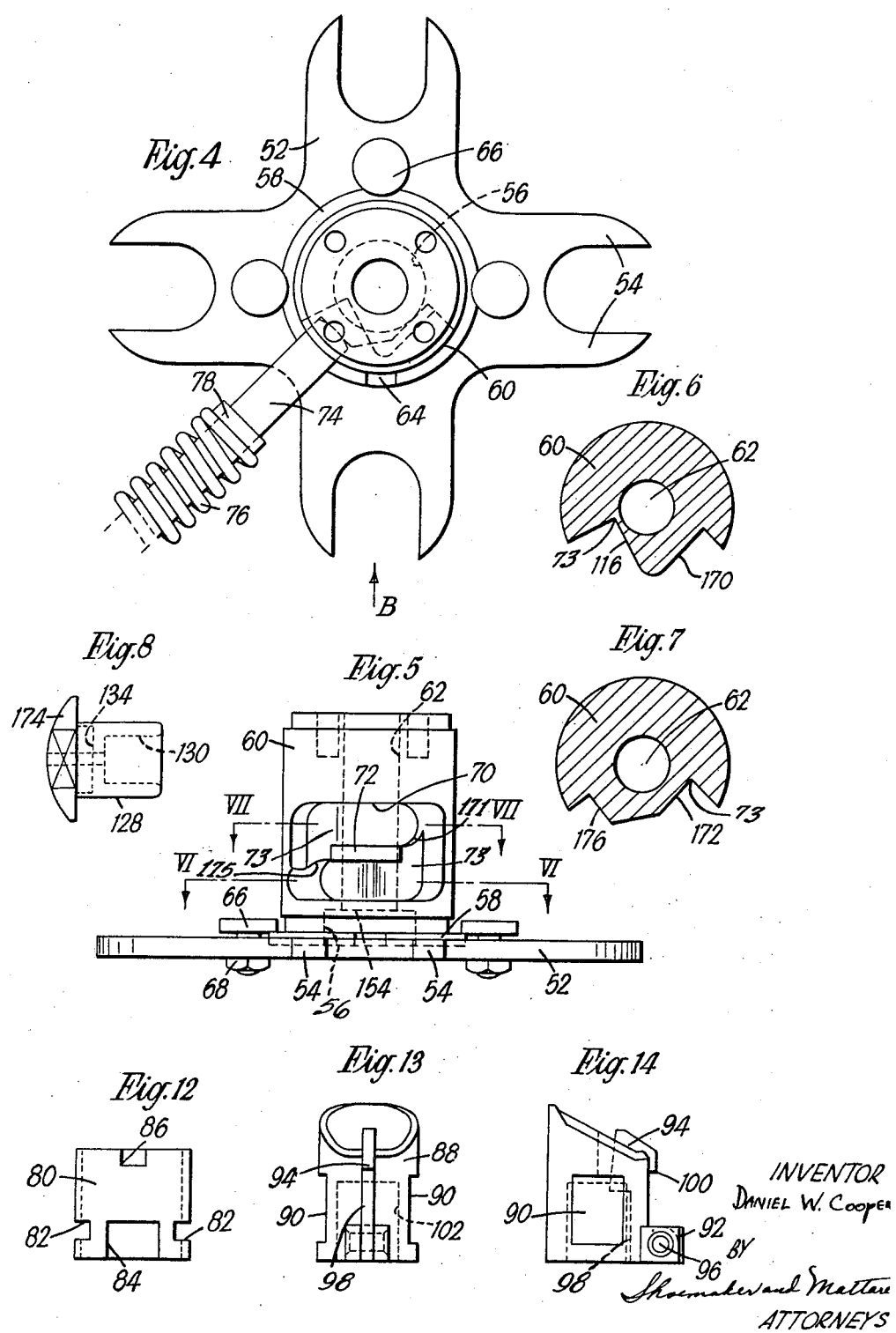

May 12, 1964     D. W. COOPER     3,132,399
QUICK-RELEASE DEVICE
Filed March 2, 1961                            4 Sheets-Sheet 3
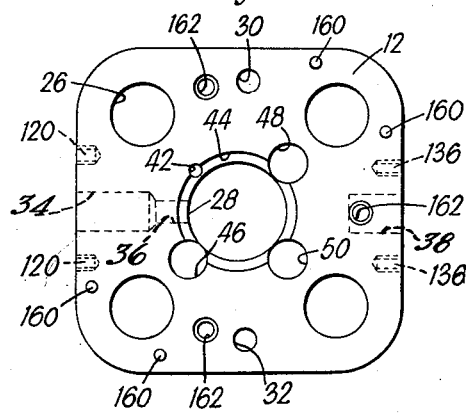
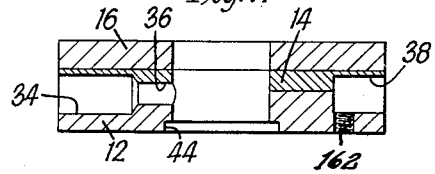
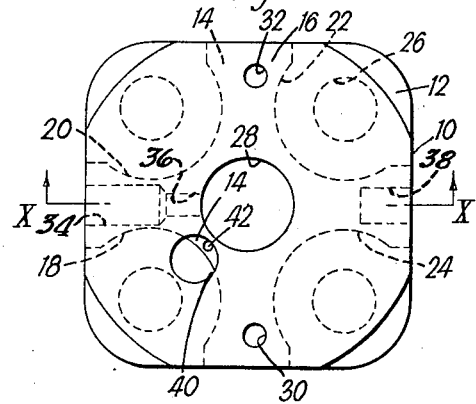
INVENTOR
Daniel W. Cooper
BY
Shoemaker and Matter
ATTORNEYS May 12, 1964     D. W. COOPER     3,132,399
QUICK-RELEASE DEVICE Filed March 2, 1961             4 Sheets-Sheet 4

INVENTOR
DANIEL W. COOPER

BY Shoemaker and Mattare
ATTORNEY

United States Patent Office 3,132,399
Patented May 12, 1964

3,132,399
QUICK-RELEASE DEVICE
Daniel Waumsley Cooper, Southhampton, England, assignor to G. Q. Parachute Company, Limited, Woking, Surrey, England, a British company
Filed Mar. 2, 1961, Ser. No. 92,891
Claims priority, application Great Britain Mar. 9, 1960
5 Claims. (Cl. 24—205.17)

This invention is for improvements in or relating to quick-release devices for parachute or similar safety harnesses.

One form of such a quick-release device includes a control member operatively connected to a plurality of spring loaded plungers these plungers and part of the control member being housed within a box or casing. The ends of the harness straps with which the device is to be used, usually four in number, in the case of a parachute harness, are provided with lugs, each lug being formed with a hole extending therethrough and adapted for engagement with a spring loaded plunger. Each of the spring loaded plungers is usually provided with a bevelled end the arrangement being such that the lugs on the harness straps are pushed into the box or casing and cause the plungers to move axially by over-riding the bevelled ends, the plungers returning by means of their spring force to their original position to engage the holes in the lugs which are thus retained in position. When one or more of the said lugs has, or have been so engaged, dis-engagement of the plunger or plungers from the lug or lugs is achieved by rotating the control member relatively to the box or casing from a first position (referred to herein as the loading position) in which its axial movement is prevented, to a second position (referred to herein as the discharge position) in which such axial movement may take place, in which discharge position it may be moved axially to a release position, its operative connection with the spring loaded plungers being such that this axial movement causes axial movement of the spring loaded plungers so that the harness lugs are released. Such a quick release device will be referred to herein as a quick-release device of the type set forth.

In order to ensure that the device can only be loaded in the loading position the control member is preferably arranged to remain in the release position until rotated to the loading position and one of the safety means acts to prevent rotation of the control member to the discharge position from its loading position until at least one of the harness lugs has been loaded.

Conveniently the safety means include a spring loaded device which acts to lock the control member against rotary movement in its loading position and having an operative part which is engaged by one of the harness lugs when it is loaded to cause the device to unlock the control member.

Preferably the means for locking the plunger to positively prevent axial movement thereof relative to the control member includes spring loaded catches which maintain each plunger in position relative to the control member, each catch being released to allow its respective plunger to move axially under the action of loading the appropriate harness lug and re-engaging when the lug is loaded.

The outer end of each spring loaded plunger is preferably bevelled and in order to ensure that the catch is released before the harness lug engages its associated plunger the end of the catch adjacent the outer bevelled end of the spring loaded plunger with which it is associated preferably stands proud of the said outer bevelled end so that it is initially engaged before the plunger itself, when the harness lug is loaded.

Preferably the rotary and axial positions of the control member are determined by inter-engagement of a pair of axially displaced cams formed on the control member with a co-operating spring loaded cam-follower.

A safety device to ensure that undue strain is not placed on the spring loaded cam-follower may also be included which may comprise a safety lug which is connected to the control member and acts against a co-operating retractable boss to safeguard the control member against axial movement relative to the box or casing in its loading position. This boss is preferably retracted to prevent obstruction of the control member when it is moved from the release position to the loading position.

The present invention will now be more particularly described with reference to the accompanying drawings, in which:

FIGURE 4 illustrates a plan view of a cruciform spider which is operatively connected to the control member of the device, and a spring-biased, radially disposed cam-follower of which the radially inner end projects into a cavity formed in the body of the control member, these parts being divorced from the remainder of the mechanism;

FIGURE 5 illustrates an elevation, looking in the direction of the arrow B, of the mechanism illustrated in FIGURE 4, except the said spring-biased rod, and shows the shape in elevation of the cavity formed in the body of the control member;

FIGURES 6 and 7 illustrate sections of the control member taken along the lines VI—VI and VII—VII, respectively, in FIGURE 5;

FIGURE 8 illustrates in plan a bossed plunger the function of which in the device according to the present invention is described later;

FIGURE 9 illustrates a plan view of one face of the body of the device;

FIGURE 10 illustrates a plan view of the other face of the said body;

FIGURE 11 illustrates a section taken along the line X—X of FIGURE 9;

FIGURE 12 illustrates in elevation a sleeve which forms a part of each plunger assembly in the device according to the invention; and FIGURES 13 and 14 illustrate, in front and side elevation respectively, a plunger and its integral locking means.

Figure 1:
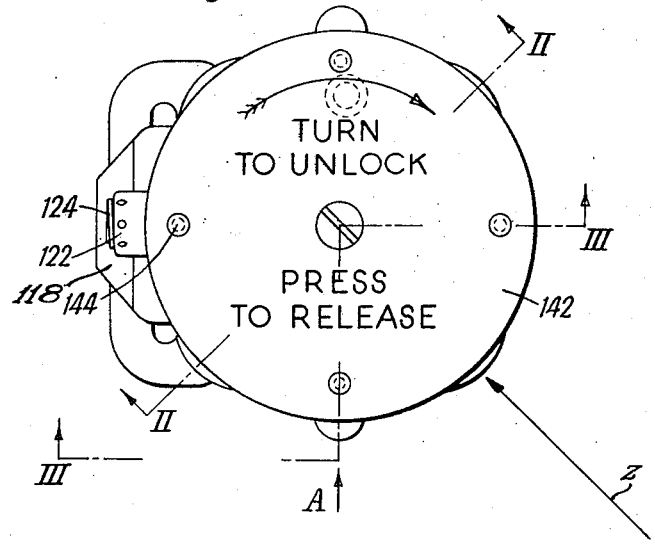
FIGURE 1 illustrates in plan a quick-release device of the type described and constructed in accordance with the present invention.

Referring to the drawings, the quick-release device according to the present invention consists of a body 10 which provides a box or casing (FIGURES 9, 10 and 11) and which is built up from three parts, namely, a plate 12 of approximately square shape in plan, a Maltese-cross-shaped member 14 and a plate 16 of approximately square shape in plan. The two plates 12, 16 and the member 14 are secured to one another in any suitable manner to form a unitary structure hereinafter referred to as the body 10.

It will be seen that the member 14, in conjuction with the plates 12, 16, forms four cavities 18, 20, 22, 24. The plate 12 has four circular holes 26 formed therein which communicate with the said cavities, the centres of the circles being disposed on the diagonals of the approximately square plate 12, the intersection of the said diagonals being coincident with the axis of a bore 28 which extends through the plates 12, 16 and through the member 14. A pair of holes 30, 32 is provided, each hole extending through the plates 12, 16 and through the member 14.

A bore 34 extends from the perimeter of the body 10 to the bore 28, for a purpose hereinafter described, the said bore having an inner portion 36 of the axial length thereof which is of reduced diameter compared with the axially outer portion. Diametrically opposite to the bore 34 is a bore 38.

Located with their centres on the diagonal which extends through the centres of the bore 28 and those holes 26 which communicate with the cavities 18 and 22 is a pair of holes. One hole 40 of the pair extends through the plate 16 but not through the member 14 or the plate 12. The other hole 42 of the pair extends through the member 14 and the plate 12 and communicates with a bore 44 in the plate 12. The bore 44 is coaxial with and of a larger diameter than the bore 28 but is of relatively small axial length as will be appreciated from FIGURE 11.

Arranged with their centres on the diagonals of the plate 12 are three cavities 46, 48, 50, of which the cavity 50 is diametrically opposed to the bore 42. The cavities 46, 48, 50 are all of an axial length greater than that of the bore 44 but considerably less than that of the bore 28.

Referring to FIGURES 4 and 5, there is illustrated a cruciform spider 52, the arms of which are formed with bifurcated ends 54. There is a centrally disposed bore 56 in the spider 52 and, co-axial with this bore 56, a seat portion of small axial length in which there is arranged to sit the flanged end 58 of a cylindrical control member 60 which is formed with a central axial bore 62. The flange 58 is formed with a notch 64 and three mushroom-headed studs 66 are secured in the body of the spider 52 by nuts 68. The heads of the studs 66 overlie the flange 58 in order to prevent separation of the control member 60 from the spider 52 but in such a manner that rotary movement of the control member 60 is not inhibited.

A cavity 70 is formed in the cylindrical body of the control member 60, an island portion 72 remaining untouched and being, therefore, of the same diameter as the remainder of the body of the member 60. The cavity 70 consists, as will be appreciated from an inspection of FIGURES 6 and 7, of two series of conjoined cam faces which are arranged horizontally, the ends of which are connected together by vertically disposed channels 73. One end of a radially disposed cam-follower 74 (hereinafter called the rod 74) is illustrated in FIGURE 4 as bearing against one of the two series of cam faces in the cavity 70, a spring 76 bearing against a collar 78 formed on the rod 74. The disposition and function of these parts in the device will be explained later.

Referring to FIGURES 12, 13 and 14 there is illustrated a cylindrical sleeve 80 having a pair of diametrically opposed circumferential slots 82 cut therein and a pair of axial slots or notches 84, 86. A cylindrical plunger 88 with a bevelled end is arranged to be housed within the sleeve 80 with a pair of cut-away portions 90 in register with the slots 82 of the sleeve 80. The outside diameter of the plunger 88 is such, in relation to the inside diameter of the sleeve 80, that the plunger is capable of sliding freely in the sleeve. The plunger 88 is formed with a pair of substantially radial lugs 92 between which a plunger catch 94 is mounted for rotation about the axis of a spindle 96, substantially the whole of the catch 94 being disposed in a slit 98. When the plunger 88 is located within the sleeve 80 with the catch 94 in the position illustrated in FIGURE 14, the slot 84 is occupied by the lugs 92 and the projecting portion 100 of the catch 94 occupies the slot 86 (see FIGURE 2). It will be appreciated that, with these parts thus positioned, if the sleeve 80 is prevented from moving, the plunger 88 is also prevented from moving relatively to the sleeve 80 by the lugs 92 which abut the inner end of the slot 84 and by the catch 94 of which the projecting portion 100 abuts the inner end of the slot 86.

The plunger 88 is also formed with an axial bore 102 (FIGURES 13 and 2) for a purpose hereinafter described.

The assembly of the device so far described is as follows:

Each of the four plungers 88 is located within its associated sleeve 80 and these sub-assemblies are inserted between the bifurcated ends of the arms of the spider 52 in such a manner that, with each plunger and sleeve, the said ends 54 slide into the slots 82 of the sleeve 80 and thus also into the cut-away portions 90 of the plunger 88. Each catch 94 faces radially outwardly (see FIGURE 2).

The control member 60 is inserted into the bore 28 (FIGURE 10) so that, when the member 60 is pushed as far as it will go through the bore, the three studs 66 are accommodated within the cavities 46, 48, 50, and the member 60 is then rotated to bring the notch 64 in the flange 58 into register with the bore 42. An eccentrically turned locking device 104 is now employed to lock the control member 60 against rotation about its axis of rotation. The device 104 consists of a cup-like portion 106 from the underside of which there extends an eccentric spigot 108 which is provided with a squared free end, the spigot 108 being inserted through the bores 40 and 42 with the result that the squared end thereof enters and rests in the notch 64. A spring 110 is inserted in the portion 106 (as in FIGURE 2) and a cover plate 112 is so placed over the plate 16 and the spring 110 that the upper end of the spring 110 projects into a circular recess 114 formed in the cover plate 112. The cover plate 112 is also provided with a pair of holes (not illustrated) which registers with the pair of holes 30, 32 and a pair of bolts (not illustrated) is inserted into these holes in such a manner that, when a pair of nuts (not illustrated) is screwed on the threaded shanks of the bolts, the nuts are tightened up against the plate 12, thereby compressing the spring 110.

It will be appreciated that the sleeves 80 and the plungers 88 extend into the four holes 26 when the control member is inserted into the bore 28.

The rod 74 is now inserted into the bore 34 and pushed until the leading end thereof has passed through the portion 36 of reduced diameter and has come to rest in contact with a face 116 (see FIGURE 6) of the cavity 70. The spring 76 is threaded around the shank of the rod 74 and is seated against the collar 78. Thereafter, a spring bracket guard 118 is mounted on the plate 12 by means of a pair of screws (not illustrated) which are screwed into tapped holes 120 (see FIGURE 10). The bracket guard 118, which is provided with a bevelled face 119 to prevent fouling of the harness straps with said bracket guard, also includes an internally threaded sleeve 122 into which a threaded plug 124 is screwed in order to compress the spring 76. Compression of this spring makes more positive the engagement of the various cam faces of the cavity 70 by the rod 74 during operation of the quick-release device as hereinafter explained.

A spring 126 is inserted into the bore 38 and a bossed plunger 128, which is formed with a recess 130 for the accommodation of the outer end of the spring 126 (FIGURES 3 and 8), is also inserted into the bore 38 and the plunger 128 is held in place against the influence of the compressed spring 126 by a guard 132 which engages a step 134 formed in the plunger 128 and which is secured to the plate 12 by means of a pair of screws (not illustrated) which are screwed into tapped holes 136 (FIGURE 10).

A cap 138 is now placed over the free end of the control member 60, this free end being of reduced diameter (FIGURES 2 to 5). The cap 138 and the control member 60 are provided with four smooth-bore, axial holes through two of which, when all four holes are in register, a pair of pins 140 extend. The pins 140 extend through diametrically opposite holes and are of such a length that they have a portion which projects beyond the upper surface of the cap 138 (FIGURE 3) and this projecting portion of each pin is adapted to extend into two holes formed in a cover 142 so as to provide a driving connection between the cover 142 and the control member 60.

The cover 142 has secured thereto by rivets 144 a skirt 146 of uniform axial length with the exception of an integral lug 148 (FIGURE 3) which is of greater axial length than the skirt 146. A bolt 150 is now inserted through the aligned bores in the cover 142, cap 138, control member 60 and spider 52 and the threaded end of the bolt 150 has screwed thereon a nut 152 which is tightened up against the axially inner end of a recess 154 formed in the control member 60.

A spring 156 is now placed in the bore 102 of each plunger 88, a dished cover 158 is located over the springs 156 by means of locating pins 160 (FIGURE 10) in such a manner that three holes therein (only one visible in FIGURE 3) register with three threaded holes 162 (see FIGURE 10). A plate 164 is placed on top of the cover 158 (FIGURE 3), the plate 164 also having three holes therein (only one visible in FIGURE 3). Three screws 166 (only one visible in FIGURE 3) are then inserted through the holes in the plate 164 and in the cover 158 and are screwed into the holes 162 both to compress all the springs 156 and to secure the cover 158 and the plate 164 in position.

Figure 2:
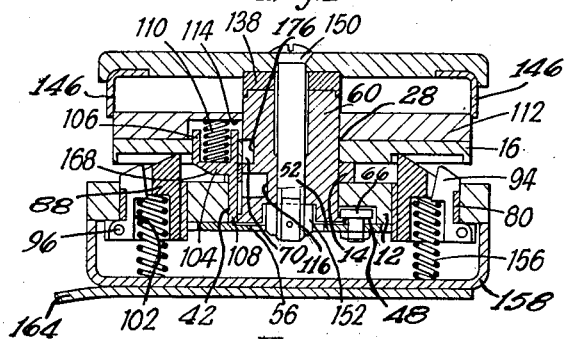
FIGURE 2 is an axial section along the line II—II of FIGURE 1.
Figure 3:
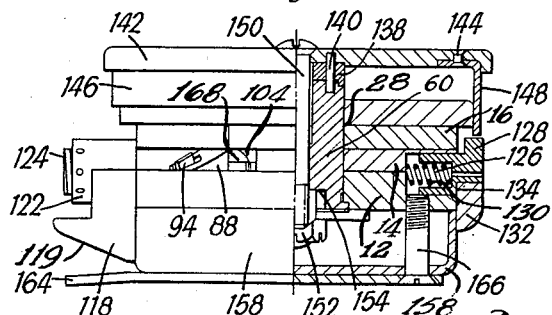
FIGURE 3 is a view of the device along the line III—III in FIGURE 1.
Figure 15:
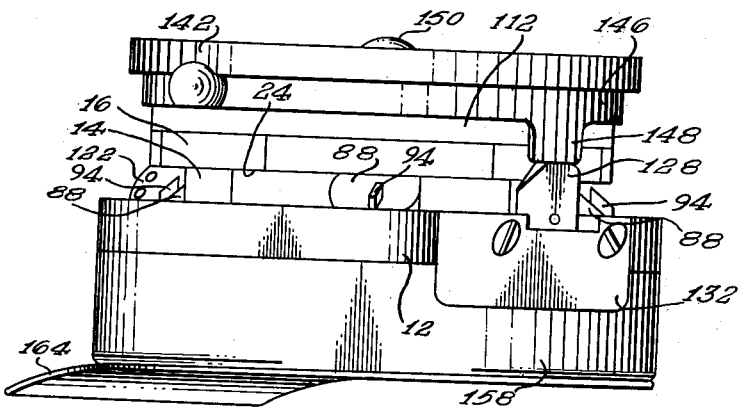
FIGURE 15 is an elevation of the device disclosing certain outside details and FIGURE 16 is a cross section like FIGURE 2 but showing the parts in "release" condition.
Figure 16:
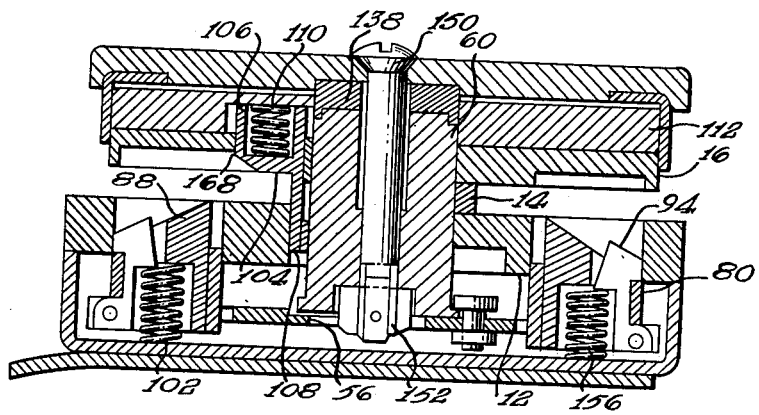

The operation of the device is as follows:

With the quick-release device in the condition illustrated in FIGURES 1 to 3, namely, in the loading position the four lugs on the parachute harness straps are pushed into the cavities 18, 20, 22, 24 formed in the body 10. When each lug is so pushed, the catch 94 with which it comes into contact is rotated about the axis of the spindle 96 towards the control member 60, thereby moving the catch 94 to a position in which the projecting portion 100 thereof is clear of the sleeve 80. Thus, when the lug is pushed further, the plunger 88 is pushed downwardly because it is permitted to do so by virtue of its catch 94 having been disabled and because the lug rides over the bevelled end of the plunger. The sleeve 80 remains stationary because it is held by the spider 52 but the bifurcated ends 54 of the arms of the said spider do not prevent the plunger 88 from moving because of the relatively long (in the axial dimension) cut-away portions 90 formed in the said plungers 88. When the hole in the lug is in register with the plunger 88, the said plunger is urged upwardly (as viewed in FIGURE 2) through the said hole under the influence of the spring 156. As soon as the lug is engaged in this manner the catch 94 moves radially outwardly also under the influence of the spring 156 and latches over the sleeve 80.

When the leading end of the lug which is pushed into the cavity 18 moves past the plunger 88, it comes into contact with a bevelled face 168 of the locking device 104 and moves the said device 104 upwardly (as seen in FIGURE 2). This upward movement moves the squared end of the spigot 108 out of the notch 64 in the flange 58 of the control member 60. It will, therefore, be apparent that, if a lug is not pushed into the cavity 18, the squared end of the spigot 108 would remain seated in the notch 64, thereby inhibiting rotary movement of the control member about its axis of rotation. This action also ensures that when the control member is placed in this loading position it is not possible to alter it until a lug has been loaded into this cavity 18.

However, when four lugs have been pushed into the cavities 18, 20, 22, 24 and are retained therein by the plungers 88 extending through the holes in the said lugs, any force tending to move the plungers 88 in an axial direction (downwardly as seen in FIGURE 2) against the influence of the springs 156 will be resisted by the catches 94 which are hooked over the sleeves 80 which, in turn, are held immovable by the bifurcated ends 54 of the arms of the spider 52. The spider 52 is secured to the control member 60 and the said control member is fixed to the cover 142 the lug 148 of which is supported, in this loading position of the quick-release device, by the bossed plunger 128. Also, the inner end of the rod 74 is urged into contact with the cam face 116 and, as this cam face is recessed when compared with cam face 176 immediately above it, the rod 74 prevents axial movement upwardly or downwardly of the control member 60. Thus, the G-effect due to excessive acceleration will not cause unintentional release of the lugs. Further, from what has been said above, it will be obvious that the support given to the lug 148 and thus to the cover 142 by the bossed plunger 128 and also to the control member 60 by the rod 74 guards against the prevents accidental release of the lugs due to impact because the control member is not free to move downwardly as a result of such impact in this loading position.

When it is desired to release the harness strap lugs, the cover 142 must be turned through approximately 90° to a "discharge position." This causes the lug 148 to move to a position clear of the plunger 128 and also, of course, rotates the control member 60 by means of the drive pins 140. Rotation of the control member 60 with respect to the spider 52 causes the rod 74 to move along the lower series of cam faces, namely, from the cam face 116 to the cam face 170 (FIGURE 6). It is, in fact, the rod 74 coming into contact with the end face of the said lower series of cam faces that determines the extent of rotation of the cover 142. The cover and control member are now in a position in which they can be moved axially because the cam face 172 is recessed as compared with the cam face 170 immediately below it (see FIGURES 5, 6 and 7).

When the 90° turn has been made, the cover 142 is pressed axially downwardly to the "release" position. Downwards pressure on the cover 142 will move the spider 52 downwardly and the spider will move the sleeves 80 downwardly. Since the lugs 92 project through the slots 84 in the sleeves, the plungers 88 are all simultaneously moved axially downwardly against the influence of the springs 156 thereby releasing the lugs of the harness straps. This downwards movement of the cover 142 and, therefore, of the control member 60 causes the rod 74 to move along a vertically disposed channel (as seen in FIGURE 5) into contact with the cam face 172 (FIGURE 7) of the cam faces formed in the cavity 70.

When the strap lugs have been freed as described above, the cover 142 and the control member 60 and the spider 52 will all remain in the "release" position referred to because the step between cam faces 172 and 170 will retain the rod 74 on cam face 172 and thus prevent the control member 60 and its associated parts from rising under the action of the springs 156. Thus, if, whilst the quick-release device is in this release position, the strap lugs are pushed into the cavities 18, 20, 22, 24, they will fall out again because all the plungers 88 which would normally engage the lugs are in their fully retracted positions.

To reset the device to the loading position, the cover 142 is rotated through approximately 90° in a direction opposite to that in which it was turned to release the lugs. In so doing, the lug 148 on the cover 142 will come into contact with the arcuate face 174 (FIGURE 8) of the bossed plunger 128 and will thereby move the plunger 128 radially inwardly against the influence of the spring 126. However, when the plunger 128 and the lug 148 are aligned again, the rod 74 will be aligned with and free to move along a vertical channel under the influence of the springs 156 into contact with the cam face 116 which is recessed as compared with cam face 176 having traversed the cam faces from cam face 172 to face 176 of the upper series of cam faces. When the lug 148 is once again located above the plunger 128 which is restored under the influence of the spring 126 to the position seen in FIGURE 1, the notch 64 in the flange 58 of the control member 60 is once again aligned with the bore 42 and the squared end of the spigot 108 will move into this notch 64 under the influence of the spring 110, thereby locking the control member 60 against rotary movement about its axis of rotation. This locking of the control member 60 will be maintained until a lug is inserted again into the cavity 18 in the body 10.

It will be apparent from the foregoing description in general and from FIGURES 6 and 7 in particular that accidental impact on the cover 142 will not release the strap lugs if the cover has not previously been turned through 90° from the loading position to the discharge position because, firstly, the lug 148 is supported by the plunger 128 and, secondly, the inner end of the rod 74 is in contact with the cam face 116 which is recessed more than the cam face 176 to provide a step 175 (FIGURE 5) between them and over which the rod 74 cannot move.

Thus it will be seen that the device can only be loaded in the "loading" position as it cannot be moved to the "discharge" position until the spigot 108 is released by the action of loading the lug into the cavity 18, and it cannot be loaded in the release position because the plungers 88 are retracted. Moreover, the control member cannot be returned from the "release" position to the discharge position without passing through the loading position because of the action of the stepped cam faces. In the "loading" position the control member is positively inhibited from axial movement by the rod 74 acting on the step 175 between the cam faces, and the action of the lug 148 and the bossed plunger 128, and as the plungers 88 are prevented from moving in an axial direction relative to the control member 60 by reasons of the catches 74 it will be seen that the device is effective in preventing inadvertent release of the harness lugs in this position which is the only one in which the lugs can be loaded.

Moreover it will be appreciated that the safety means are self-locking so that no further action on the part of the operator is necessary once the harness lugs have been loaded into the device, until it is required to release them.

What I claim as my invention and desire to secure by Letters Patent of the United States is:

1. A quick-release device for parachutes and the like having mutually distinct "loading," "discharge" and "release" positions, said device comprising, in combination, a body; a control member mounted in said body for rotary and axial movements relative thereto; locking means mounted in said body for engagement with and consequent prevention of rotary movement of said control member; a plurality of plungers having their axes parallel to the axis of rotation of said control member; a sleeve encircling each plunger; connecting means for securing each sleeve to said control member to prevent relative axial movement between any sleeve and said control member; a releasable catch operable to lock to one another each plunger and its encircling sleeve; detent means mounted in said body and coacting with said control member to permit axial movements of said control member relative to said body only in predetermined directions under predetermined conditions; the control member of the quick-release device being locked against rotary movement by said locking means and against axial movement in any direction by said detent means in the "loading" position; subsequent displacement of said locking means out of engagement with said control member permitting rotation of said control member from the "loading" position to the "discharge" position; said detent means permitting subsequent axial movement of said control member in a first direction from the "discharge" position to the "release" position and preventing reversal of said axial movement once completed; subsequent and consecutive rotary movement and axial movement in a second direction opposite to said first direction of said "loading" position, said detent means preventing reversal of said axial movement in a second direction once completed; said locking means again engaging with said control member in said "loading" position.

2. A quick-release device for parachutes and the like having mutually distinct "loading," "discharge" and "release" positions, said device comprising, in combination, a body having portions which define a plurality of radially oriented cavities; a control member mounted in said body for rotary and axial movements relative thereto; spring-urged locking means mounted in said body for engagement with and consequent prevention of rotary movement of said control member when said quick-release device is in said "loading" position, said locking means being displaceable along an axis parallel to the axis of rotation of said control member against said spring influence; a plurality of plungers having their axes parallel to the axis of rotation of said control member; a sleeve encircling each plunger; elements of said plungers and of said sleeves which define, respectively, cut-away portions in said plungers and slots in said sleeves, said portions and said slots being in radial registration with one another; means connected to said control member and adapted for engagement with the several portions and slots of the plungers and sleeves, respectively, which are in radial registration with one another; each cut-away portion being of such greater axial dimension than that of each slot as to permit relative movement between the plunger on the one hand and the sleeve and said means on the other hand; a pivoted catch mounted upon each plunger and adapted in a first operative position thereof to lock the plunger and the encircling sleeve to one another; a portion of said locking means extending into a cavity in said body; a portion of a plunger and a portion of a pivoted catch extending into each of the cavities in said body; a first and a second series of conjoined cam faces formed in said control member; a spring-urged cam-follower housed in said body and in contact in said "loading" position with a first cam face of said first series of cam faces; axial displacement of said locking means out of engagement with said control member permitting rotation of said control member to the "discharge" position in which said cam-follower is in contact with a second cam face of said first series of cam faces; subsequent axial movement of said control member altering said device from said "discharge" position to the "release" position in which each of said plungers and each of said pivoted catches is moved out of the respective cavity and also causing said cam-follower to move into contact with a first cam face of said second series of cam faces; subsequent rotary movement of said control member ensuring resetting of the device to the "loading" position; and a pair of steps formed between said first and said second series of conjoined cam faces and operable to inhibit movement direct from the "loading" position to the "release" position and movement direct from the "release" position to the "discharge" position, respectively.

3. A quick-release device as claimed in claim 2, including a cover secured and drivingly connected to said control member; a lug carried by said cover in fixed relation thereto; a support member housed in said body and disposed in proximity to said lug; said lug and said support member in the "loading" position preventing axial movement of the assembly which consists of the control member, the plungers, the catches, the sleeves and the connecting means between the control member on the one hand and the plungers and the sleeves on the other hand.

4. A harness for a parachutist or the like which comprises, in combination, a plurality of harness straps; an apertured lug secured to each harness strap; a body having portions which define a plurality of radially oriented cavities; a control member mounted in said body for rotary and axial movements relative thereto; a spring-urged, axially displaceable locking means mounted in said body for engagement with and consequent prevention of rotary movement of said control member; a plurality of spring-urged plungers having their axes parallel to the axis of rotation of said control member; a sleeve encircling each plunger; means connecting said control member to each plunger and to each sleeve, said connection being such that relative movement between said sleeve and said connecting means is prevented and such that relative movement between said plunger and said sleeve is possible; a spring-urged catch associated with each plunger and sleeve operable to ensure that said relative movement between said plunger and said sleeve is permissive; a portion of said locking means extending into one of said cavities in said body; a portion of a plunger and a portion of a catch extending into each of the cavities in said body; a first and a second series of conjoined cam faces formed in said control member; a spring-urged cam-follower housed in said body and in contact in a "loading" position with a first cam face of said first series of cam faces; insertion of an apertured lug into that cavity into which there extend both a portion of said locking means and a portion of each of a plunger and a catch causing said apertured lug to become engaged by said plunger following disengagement of said catch, axial movement of said plunger and re-engagement of said catch and causing axial displacement of said locking means and consequent disengagement of said locking means from said control member; subsequent rotation of said control member in a first direction of rotation from said "loading" position to a "discharge" position causing said cam-follower to come into contact with a second cam face of said first series of cam faces; subsequent axial movement of said control member from said "discharge" position to a "release" position causing said plunger, said catch and said sleeve to be moved axially whereby said plunger is moved out of engagement with and thus releases said apertured lug and also causing the cam-follower to move into contact with a first cam face of said second series of cam faces; subsequent rotation of said control member in a second direction of rotation opposite to said first direction of rotation ensuring that said cam-follower is caused to move again into said "loading" position; and a pair of steps formed between said first and said second series of conjoined cam faces and operable to inhibit movement of said control member direct from the "loading" position to the "release" position and movement direct from the "release" position to the "discharge" position, respectively.

5. A harness as claimed in claim 4, including a cover secured and drivingly connected to said control member: a lug carried by said cover in fixed relation thereto; a support member housed in said body and disposed in proximity to said lug; said lug and said support member in the "loading" position preventing axial movement of the assembly which consists of the control member, the plungers, the catches, the sleeves and the connecting means between the control member on the one hand and the plungers and the sleeves on the other hand.

References Cited in the file of this patent

UNITED STATES PATENTS

| 2,668,997 | Irvin | Feb. 16, 1954 |
| 2,989,274 | Moran | June 20, 1961 |

FOREIGN PATENTS

| 1,019,455 | France | Jan. 22, 1953 |
| 1,099,122 | France | Aug. 30, 1955 |
| 1,070,034 | Germany | Nov. 26, 1959 |
| 686,192 | Great Britain | Jan. 21, 1953 |